2,801,217
Patented July 30, 1957

2,801,217

DIALKYLAMMONIUM DIALKYLCARBAMATES AS SELECTIVE SOLVENTS FOR UNSATURATED HYDROCARBONS

William T. Nelson, Bartlesville, Okla., assignor to Phillips Petroleum Company, a corporation of Delaware No Drawing. Application November 4, 1953, Serial No. 390,257

31 Claims. (Cl. 252—1)

This invention relates to the separation of normally gaseous, unsaturated hydrocarbons from normally gaseous, less unsaturated hydrocarbons. The invention also relates to a method for selective solvent removal of acetylene from gases containing the same employing a solvent novel for this purpose. The invention also relates to a class of compounds which are selective solvents novel for the purpose of removing acetylene from gases containing the same. The invention also relates to a method for the storage of acetylene or other unsaturated hydrocarbons. Further, the invention relates to a novel solution containing acetylene.

I have now found that substituted ammonium salts such as dialkylammonium dialkylcarbamates are effective solvents for separating normally gaseous, unsaturated hydrocarbons from normally gaseous, less unsaturated hydrocarbons, and are particularly applicable to the separation of acetylene from gaseous mixtures containing acetylene, and that said solvents exhibit good selectivity.

Acetylene may be produced by thermal treatment of hydrocarbons by a variety of methods. Among such methods are the treatment of hydrocarbons of the methane and ethylene series by controlled pyrolysis, passage of such hydrocarbons through an electric arc, incomplete combustion and the like. Acetylene is also found as a minor constituent in other refinery streams resulting from cracking, dehydrogenation, and other similar reactions involving thermal or catalytic treatment of hydrocarbon fractions of petroleum derivatives. These gaseous streams usually contain a relatively small percentage of acetylene as compared to the other constituents which may be present, such as hydrogen, carbon monoxide, carbon dioxide, methane, ethane, ethylene, nitrogen, or the like. A major problem arises in the separation of the several constituents of such gaseous mixtures and particularly the concentration and/or separation of acetylene. For the recovery of acetylene and other unsaturated compounds from gaseous mixtures, selective solvent extraction has been employed. The most commonly employed solvent is acetone; however, other solvents such as the dialkyl formamides, the aliphatic lactones, the esters of polyhydric alcohols, the polyketones, and the like have been either proposed or employed. An ideal solvent for acetylene should have the properties of high solubility for acetylene, high selectivity for acetylene over the other constituents of the gaseous mixture, high boiling point, high thermal stability, low vapor pressure at ordinary temperatures, and absence of chemical reaction with acetylene or other constituents of the gaseous stream. Although the compounds heretofore suggested for this purpose accomplish acetylene removal and recovery, there is considerable room for improvement as is well-known in the art.

A liquid having high solvent power for acetylene is also important in the storage of acetylene in pressure-retaining vessels. Acetylene is commonly stored in pressure containers which are partially filled with balsa wood or other absorbent and porous material into which the solvent containing dissolved acetylene is introduced under pressure. The higher the solvent power of the solvent used, the larger is the volume of acetylene which may be introduced into the container at the stated pressure, and solvents of high solvent power are, therefore, desirable.

As stated, I have now discovered that substituted ammonium salts such as dialkylammonium dialkylcarbamates are effective solvents for the separation of normally gaseous, unsaturated hydrocarbons from normally gaseous, less unsaturated hydrocarbons, especially for the separation of acetylenes from gaseous mixtures containing them. I have found the capacity of dimethylammonium dimethylcarbamate for acetylene ($C_2H_2$) to be comparable to the capacities of acetone and trimethylcarbamate, solvents of the prior art, but that the selectivity of dimethyl ammonium dimethylcarbamate for acetylene over ethylene is considerably better than the selectivity of other solvents such as acetone; this increased selectivity being realized with very little sacrifice in capacity of the solvent. This better selectivity for acetylene of the solvent of my invention is of considerable value in solvent extraction processes in which acetylene is recovered from gaseous streams containing ethylene. If $CO_2$ and/or $H_2S$ are also present in the gaseous stream from which acetylene is being recovered, the $CO_2$ and/or $H_2S$ are also absorbed along with the acetylene and the separation and recovery of the acetylene is effected in a separate step.

The class of compounds which are applicable in the practice of my invention have the formula

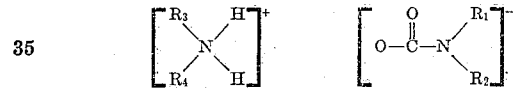

wherein $R_1$, $R_2$, $R_3$, and $R_4$ are alkyl groups which are not necessarily alike and wherein each alkyl group contains not more than 3 carbon atoms. Such compounds include dimethylammonium dimethylcarbamate, dimethylammonium diethylcarbamate, diethylammonium dimethylcarbamate, dipropylammonium dipropylcarbamate, dimethylammonium diisopropylcarbamate, and the like. The total number of carbon atoms per alkyl group preferably should not exceed 2. Some of the properties of the solvents of the invention, exemplified by those of dimethylammonium dimethylcarbamate, are given in Table I for comparison with dimethyl formamide.

TABLE I
*Properties of solvents*

| | Dimethyl-ammonium Dimethyl-carbamate | Dimethyl-Formamide |
|---|---|---|
| Molecular Weight | 134.2 | 73.1 |
| Boiling Point, °C | 60.2 | 152.8 |
| Vapor Pressure: | | |
| at 25° C., mm | 81 | |
| at 30° C., mm | | 5 |
| Specific Gravity, 25° C | 1.026 | 0.9445 |

The carbamates which are liquid at a desired absorption or extraction temperature are used as a pure liquid compound or, if desired, they are diluted with water and the aqueous solutions used as the solvents. The carbamates which are solids at atmospheric temperatures or at a desired absorption temperature are dissolved in water and the resulting aqueous solutions used as the acetylene extractant. An aqueous solution of two or more of the carbamates, preferably substantially saturated solutions, is used under certain conditions to absorb acetylene.

In an acetylene recovery process, the acetylene-containing effluent stream is subjected to countercurrent scrubbing in any suitable absorbent tower, such as a spray, packed, or bubble plate tower. The solvent need not be a pure compound and may be admixed with other acetylene solvents, or liquid materials which have no selective solvent action on acetylene, such as water, disclosed above. The temperatures and pressures employed may vary over wide limits but very often ordinary temperatures and pressures are used. It is preferred to operate at a temperature substantially below the boiling point of the solvent and above the dew point of the gaseous mixture at the existing pressure. The use of superatmospheric pressure improves the capacity of the solvent for acetylene but requires more expensive equipment. The acetylene selectively absorbed in the solvent, along with small amounts of other gases, is recovered by either heating the solution to expel the gas, reducing the pressure over the solution to effect separation of the dissolved gas, or by using a combination of both features. Thereafter, the solvent is recirculated in the system.

The solubility of acetylene and ethylene in dimethylammonium dimethylcarbamate and in solvents of the art is given in Table II.

TABLE II

*Solubilities of gases at one atmosphere partial pressure and the temperature indicated*

| Solvent | 25° C. | | 30° C. | | 25° C. |
|---|---|---|---|---|---|
| | $C_2H_2$ | $C_2H_4$ | $C_2H_2$ | $C_2H_4$ | $C_2H_6$ |
| Dimethylammonium Dimethylcarbamate | 16.2 | 1.00 | | | 0.74 |
| Trimethylcarbamate | 15.4 | 2.63 | | | |
| Dimethyl Formamide | | | 25.1 | 1.77 | |
| Acetone | | | 18.85 | 3.12 | 2.76 |

These solubilities are expressed in terms of the Bunsen coefficient, alpha ($\alpha$), which is the milliliters of solute gas, calculated at 760 millimeters of pressure and 0° C., dissolved per milliliter of solvent at one atmosphere partial pressure of solute gas. All of these solvents were obtained commercially except the trimethylcarbamate which was synthesized from methyl chloroformate and dimethylamine. This synthesized trimethylcarbamate had a boiling point of 130.4° C. at 749 mm. of pressure and density (15/4) of 1.0115 in comparison to the literature values of boiling point of 131° C. at 760 mm. pressure and density (15/4) of 1.012.

The selectivity (ratio of solubilities) of dimethylammonium dimethylcarbamate for acetylene in a mixture containing acetylene and ethylene is given in Table III and compared with the selectivity of some other solvents for the same compounds.

TABLE III

*Selectivity at one atmosphere partial pressure of gas and the temperature indicated*

| Solvent | 25° C. | 30° C. | 25° C. |
|---|---|---|---|
| | $\alpha C_2H_2/\alpha C_2H_4$ | $\alpha C_2H_2/\alpha C_2H_4$ | $\alpha C_2H_4/\alpha C_2H_6$ |
| Dimethylammonium Dimethylcarbamate | 16.2 | | 1.35 |
| Trimethylcarbamate | 5.85 | | |
| Dimethyl Formamide | | 14.2 | |

It will be noted that the substituted ammonium salts of this invention are composed of a substituted ammonium cation and a dialkyl carbamate anion, e. g., substituted ammonium salts of dialkyl carbamic acids.

The invention, as noted, is applicable to the selective solution of compounds other than acetylene, for example, methylacetylene, ethylacetylene, dimethylacetylene, vinylacetylene, and diacetylene.

In its now preferred form, the invention is operative with especially good results on mixtures not containing acidic gases, i. e., mixtures from which acidic gases, for example, carbon dioxide or sulfur dioxide or hydrogen sulfide or similar gases are substantially absent. If such acidic gases are present, they will be removed together with the more unsaturated hydrocarbons. Thus, if $CO_2$ or $H_2S$ or both are present together with acetylene in the gases from which acetylene is being removed, then it will be found that the $CO_2$ or the $H_2S$ or both will also be removed from the gas mixture treated.

Reasonable variation and modification are possible within the scope of the disclosure and the appended claims to the invention, the essence of which is that there has been provided a novel method for the extraction or absorption of unsaturated hydrocarbons from less unsaturated hydrocarbons and particularly for separating acetylene from gases containing the same; a class of compounds which are selective solvents novel for the purpose of dissolving acetylene and such unsaturated hydrocarbons or preparing solutions thereof in which acetylene or such hydrocarbons can be stored, have been provided, and that the said class of compounds are substituted ammonium salts and further that said compounds can be represented by the general formula given herein.

I claim:

1. A method of selectively absorbing an acetylene from a gaseous mixture containing the same which comprises contacting said mixture with an alkyl substituted ammonium salt in which no alkyl group contains more than 3 carbon atoms.

2. The selective absorption of an acetylene from a gaseous mixture containing the same which comprises contacting said mixture with a substituted ammonium salt of a dialkyl carbamic acid in which the alkyl groups contain not more than 3 carbon atoms.

3. The selective absorption of an acetylene from a gaseous mixture containing the same which comprises contacting said gases with a dialkylammonium dialkylcarbamate, in which the alkyl groups contain not more than 3 carbon atoms.

4. The selective absorption of acetylene from a gaseous acid-free mixture containing the same which comprises contacting said gases with dimethylammonium dimethylcarbamate.

5. The absorption of acetylene in a solvent, said solvent being at least one of the compounds which can be represented by the formula

in which $R_1$, $R_2$, $R_3$, and $R_4$ are alkyl groups, in which the alkyl groups contain not more than 3 carbon atoms.

6. An absorption according to claim 5 wherein the acetylene is absorbed from a hydrocarbon gaseous mixture containing the same.

7. An absorption according to claim 5 wherein the acetylene is absorbed from a gaseous mixture containing at least one gas selected from the group consisting of ethylene, ethane, and methane and acetylene.

8. The absorption of acetylene according to claim 5 wherein each alkyl group contains not more than two carbon atoms.

9. A method for storing an acetylene which comprises dissolving said acetylene into a compound having the formula

in which $R_1$, $R_2$, $R_3$, and $R_4$ are alkyl groups, in which the alkyl groups contain not more than 3 carbon atoms.

10. A method for storing an acetylene which comprises dissolving said acetylene in an alkyl substituted ammonium salt in which no alkyl group contains more than 3 carbon atoms.

11. A method for storing acetylene which comprises dissolving said acetylene in an alkyl substituted ammonium salt of a dialkyl carbamic acid in which salt no alkyl group contains more than 3 carbon atoms.

12. A method for storing acetylene which comprises dissolving said acetylene in a dialkylammonium dialkylcarbamate, in which the alkyl groups contain not more than 3 carbon atoms.

13. A method for storing acetylene which comprises dissolving said acetylene in a dimethylammonium dimethylcarbamate.

14. A solution of an acetylene in an alkyl substituted ammonium salt in which no alkyl group contains more than 3 carbon atoms.

15. A solution of acetylene in a substituted ammonium salt of a dialkyl carbamic acid, in which the alkyl groups contain not more than 3 carbon atoms.

16. A solution of acetylene in a dialkylammonium dialkylcarbamate, in which the alkyl groups contain not more than 3 carbon atoms.

17. A solution of an acetylene in at least one of the compounds having the formula

in which $R_1$, $R_2$, $R_3$, and $R_4$ are alkyl groups, in which the alkyl groups contain not more than 3 carbon atoms.

18. A solution of acetylene in dimethylammonium dimethylcarbamate.

19. A method for storing acetylene according to claim 9 wherein each alkyl group contains not more than two carbon atoms.

20. A solution of acetylene according to claim 17 wherein each alkyl group contains not more than two carbon atoms.

21. A method of selectively absorbing an unsaturated, normally gaseous hydrocarbon from a less unsaturated, normally gaseous hydrocarbon which comprises contacting said hydrocarbons with an alkyl substituted ammonium salt in which no alkyl group contains more than 3 carbon atoms.

22. A method according to claim 21 wherein the salt is selected from the group consisting of dimethylammonium dimethylcarbamate, dimethylammonium diethylcarbamate, diethylammonium dimethylcarbamate, and dipropylammonium dipropylcarbamate.

23. A method according to claim 22 wherein the unsaturated hydrocarbon is acetylene.

24. A method according to claim 23 wherein the unsaturated hydrocarbon is acetylene contained in a mixture of gases containing substantially only hydrocarbons.

25. A solution of an unsaturated hydrocarbon in an alkyl substituted ammonium salt in which no alkyl group contains more than 3 carbon atoms.

26. A method for removing an unsaturated hydrocarbon from a gaseous mixture of hydrocarbons also containing at least one of carbon dioxide, hydrogen sulfide, and sulfur dioxide, which comprises contacting said mixture of gases with an alkyl substituted ammonium salt in which no alkyl group contains more than 3 carbon atoms so as to accomplish selective separation of at least one of said gases from said other gases.

27. A method of selectively absorbing acetylene from a nonacidic gaseous mixture containing the same which comprises contacting said mixture with an alkyl substituted ammonium salt in which alkyl contains not more than 3 carbon atoms.

28. The selective absorption of acetylene from a nonacidic gaseous mixture containing the same which comprises contacting the same with at least one of the compounds which can be represented by the formula

in which $R_1$, $R_2$, $R_3$, and $R_4$ are alkyl groups, in which the alkyl groups contain not more than 3 carbon atoms.

29. A solution according to claim 25 in which the salt is one having the general formula

in which $R_1$, $R_2$, $R_3$, and $R_4$ are alkyl groups, in which the alkyl groups contain not more than 3 carbon atoms.

30. A solution of an unsaturated hydrocarbon according to claim 29 wherein the salt is selected from the group consisting of dimethylammonium dimethylcarbamate, dimethylammonium diethylcarbamate, diethylammonium dimethylcarbamate, and dipropylammonium dipropylcarbamate.

31. A method of selectively absorbing an acetylene from a gaseous mixture containing the same which comprises contacting said mixture with an alkyl substituted ammonium salt in which alkyl does not contain more than three carbon atoms.

References Cited in the file of this patent
UNITED STATES PATENTS

| | | |
|---|---|---|
| 2,146,448 | Scott et al. | Feb. 7, 1939 |
| 2,405,693 | Hamill et al. | Aug. 13, 1946 |
| 2,636,911 | Ray | Apr. 28, 1953 |
| 2,629,709 | Uranek | Feb. 24, 1953 |